United States Patent [19]
Moore

[11] 3,845,796
[45] Nov. 5, 1974

[54] ROOT CUTTER
[76] Inventor: Calvin K. Moore, RT. 1, Boise, Idaho 83702
[22] Filed: June 14, 1973
[21] Appl. No.: 370,061

[52] U.S. Cl................ 144/1 R, 37/117.5, 37/141, 144/2 N, 180/79.2, 214/145
[51] Int. Cl............................................. B27c 9/00
[58] Field of Search .......... 37/117.5, 141; 214/145, 214/620; 180/79.2; 144/2 N, 193 R, 1 R, 176

[56] References Cited
UNITED STATES PATENTS

| 2,927,613 | 3/1960 | Franzen et al. | 144/2 N |
| 3,049,187 | 8/1962 | Medley et al. | 180/79.2 R |
| 3,198,224 | 8/1965 | Hiley | 144/2 N |
| 3,336,958 | 8/1967 | Carlton | 144/2 N |
| 3,570,566 | 3/1971 | McCreery | 144/2 N |
| 3,625,267 | 12/1971 | Welborn | 144/2 N |
| 3,777,375 | 12/1973 | Smith | 144/176 X |
| 3,778,111 | 12/1973 | Ciofani | 37/117.5 |

Primary Examiner—Andrew R. Juhasz
Assistant Examiner—W. D. Bray
Attorney, Agent, or Firm—John W. Kraft; Charles L. Kraft, II

[57] ABSTRACT

The stump clearing vehicle includes a root cutter comprising an upstandingly disposed blade having a multiplicity of detachable cutting bits suitably driven and carried on an articulating cutter carrying arms mounted to the rearwardmost terminal end of the vehicle chassis; and a sweeper-lift assembly comprising a pair of pivotally mounted, parallelly disposed lifting arms mounted at each side of the vehicle chassis, lifting forks fastened at the forwardmost terminal end of the lifting arms, detachable panel which is slidably engagable with the lifting forks and a sweeper brush mounted on a forwardly projecting arm.

2 Claims, 11 Drawing Figures

ROOT CUTTER

FIELD OF INVENTION

The present invention relates to stump clearing vehicles, and more particularly to stump clearing vehicles provided with a root cutting blade, a sweeper lift assembly, and a high load steering assembly.

DESCRIPTION OF THE PRIOR ART

Stump clearing vehicles commonly used and employed have closely resembled backhoes known in the excavating art. These stump clearing vehicles employ a variety of digging apparatus and boom lifting apparatus in removing stumps. Excavating a stump carries with it the inherent difficulties of disturbing a relatively large area and the requirement that excavating apparatus, such as large scale diggers, to be operated with extreme care to avoid damaging the digger as a result of unforeseen contact with heavy roots and the root network. Accordingly, it has been a principle characteristic of stump clearing vehicles that the excavating and lifting apparatus employ extensive mechanical power to insure that the vehicle will be more durable than the stump it is intended to remove. A principle expenditure in stump clearing activity is the cleaning up of dirt and tree debris. Commonly, this clean-up is accomplished by manual labor or by apparatus other than the stump clearing vehicle. Finally, it has been a principle problem in stump clearing vehicles that loads on the steering assembly may be quite high. The high loads are created when the vehicle is parked adjacent the work area and the vehicle is required to simultaneously lift the stump and maneuver in some direction of travel.

Accordingly, it is an object of the present invention to provide a stump clearing vehicle having stump clearing apparatus employing a blade.

It is an object of this invention that the blade stump clearing apparatus be pivotally and axially articulated with respect to the vehicle chassis.

It is an object of this invention that the blade stump clearing apparatus be provided with detachable bits.

It is a further object of this invention that the stump clearing vehicle of this invention include a lift which may be provided with a detachable panel and a rotary driven sweeper brush.

It is yet another object of this invention to provide a high load steering assembly operable to bear loads of a stump clearing vehicle.

These and other objects shall become apparent from the description following, it being understood that modifications may be made without affecting the teachings of the invention here set out.

SUMMARY OF THE INVENTION

The stump clearing vehicle includes a root cutter comprising an upstandingly disposed blade having a multiplicity of detachable cutting bits suitably driven and carried on an articulating cutter carrying arms mounted to the rearwardmost terminal end of the vehicle chassis; and a sweeper-lift assembly comprising a pair of pivotally mounted, parallelly disposed lifting arms mounted at each side of the vehicle chassis, lifting forks fastened at the forwardmost terminal end of lifting arms, detachable panel which is slidably engagable with the lifting forks and a sweeper brush mounted on a forwardly projecting arm.

The cutting bits are detachably fastened radially at the circumference of both sides of the blade and comprise a body, a neck, and a head which is projected by the neck outwardly from the terminal edge of the blade. The stump clearing vehicle may also include a steering assembly comprising an isoscles-triangular plate pivotally mounted in the A-frame of a typical vehicle chassis with the altitude disposed substantially parallel with the rectilinear axis of the chassis, push arms connected to the wheels at one of their terminal ends and at the ends opposite to the base verticies of the triangular plate. A push arm fastened to the altitude vertex of the plate perpendicularly to the altitude and a double acting hydraulic cylinder mounted rectilinearly in the chassis and having its piston pivotally fastened to the sidewardly projecting terminal end of the push arm.

A more thorough and comprehensive understanding may be had from the detailed description of the preferred embodiment when read in connection with the drawings forming a part of this specification.

Figure 1:
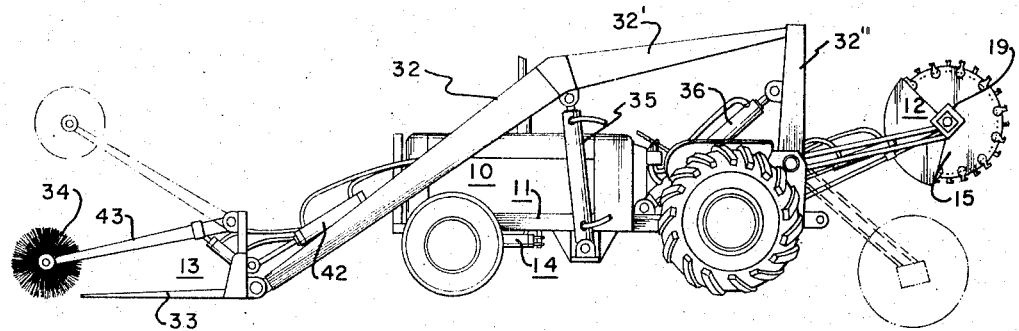
FIG. 1 is a side elevational view of the stump clearing vehicle of this invention showing the root cutter and sweeper in their several positions in broken lines for illustrative purposes.
Figure 2:
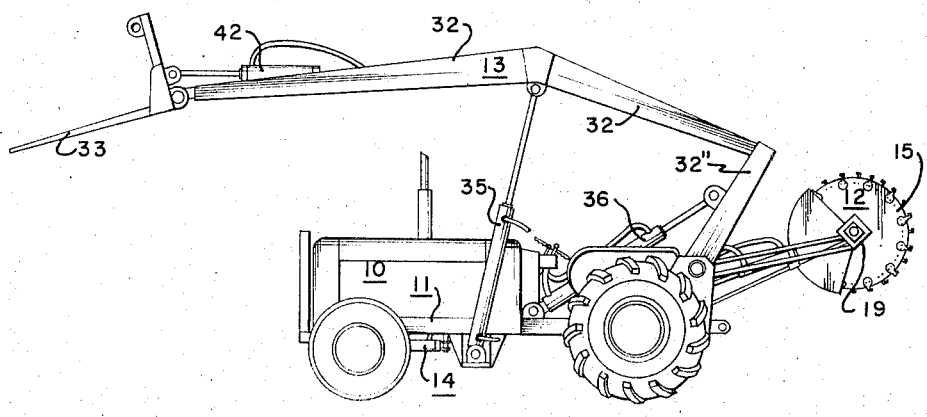
FIG. 2 is a side elevational view of the apparatus of FIG. 1, including the sweeper lift frame in its upper position shown without the sweeper assembly.
Figure 3:
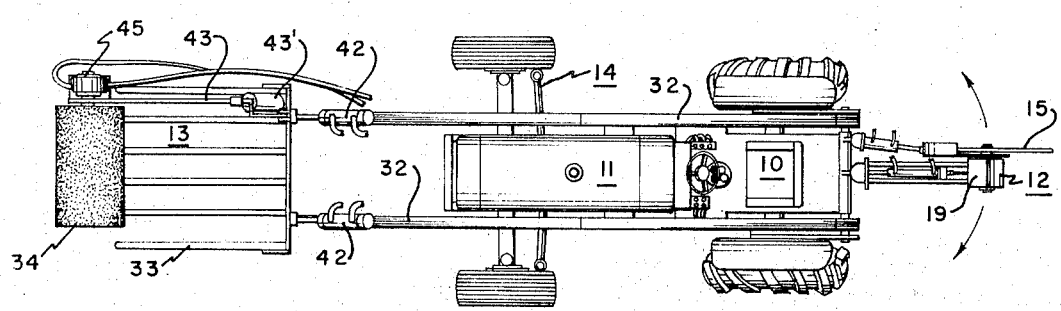
FIG. 3 is a top plan view of the stump clearing vehicle of this invention including the sweeper.

DETAILED DESCRIPTION OF THE PREFERRED EMBODIMENT:

Referring now to the drawings and more particularly to the FIGS. 1, 2 and 3, the stump clearing vehicle of this invention is shown to advantage and generally identified by the numeral 10. The stump clearing vehicle 10 comprises a chassis 11, a root cutter 12, a sweeper-lift assembly 13 and a steering assembly 14. The chassis assembly 11 is a typical tractor-like frame including an engine-transmission train, wheels and braking means, and the like (not shown). The chassis 11 may be of any of a variety of types which is operable to carry either and or both the root cutter 12 and the sweeper-lift assembly 13 apparatus.

Figure 4:
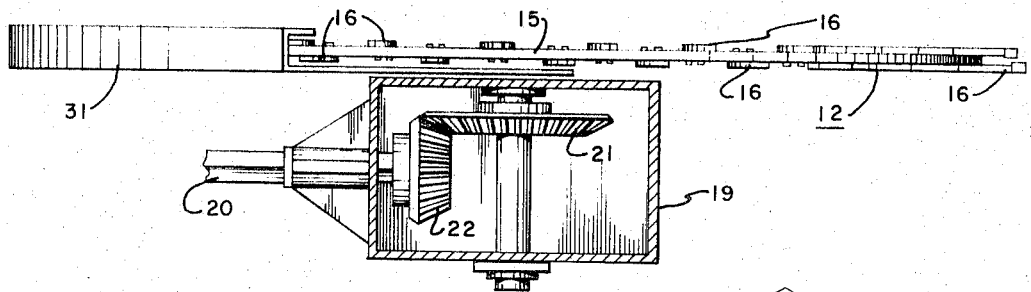
FIG. 4 is a fragmentary top plan view of the cutter blade and the gear box shown with the top wall removed for illustrative purposes.
Figure 7:
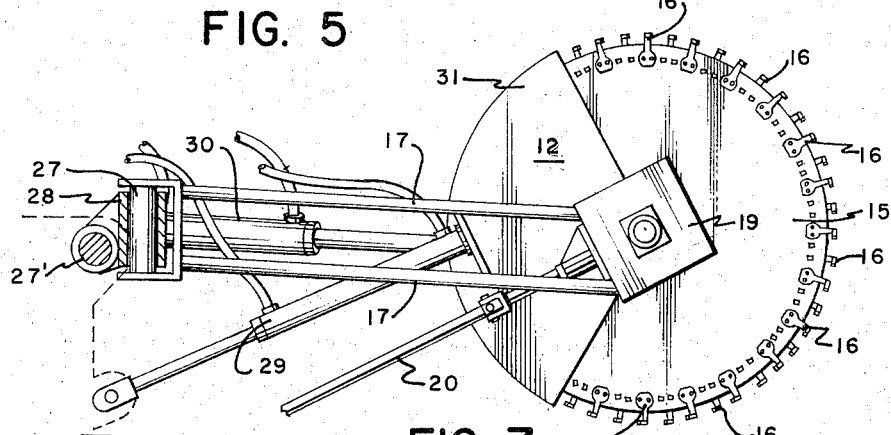
FIG. 7 is a side elevational view of the root cutter assembly.
Figure 8:
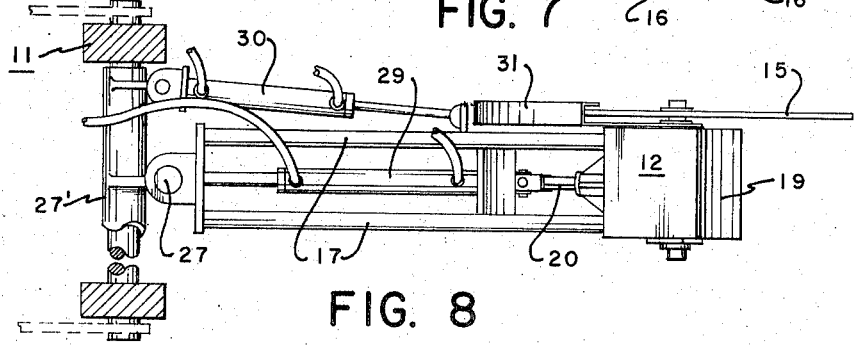
FIG. 8 is a top plan view of the apparatus of the FIG. 7.
Figure 9:
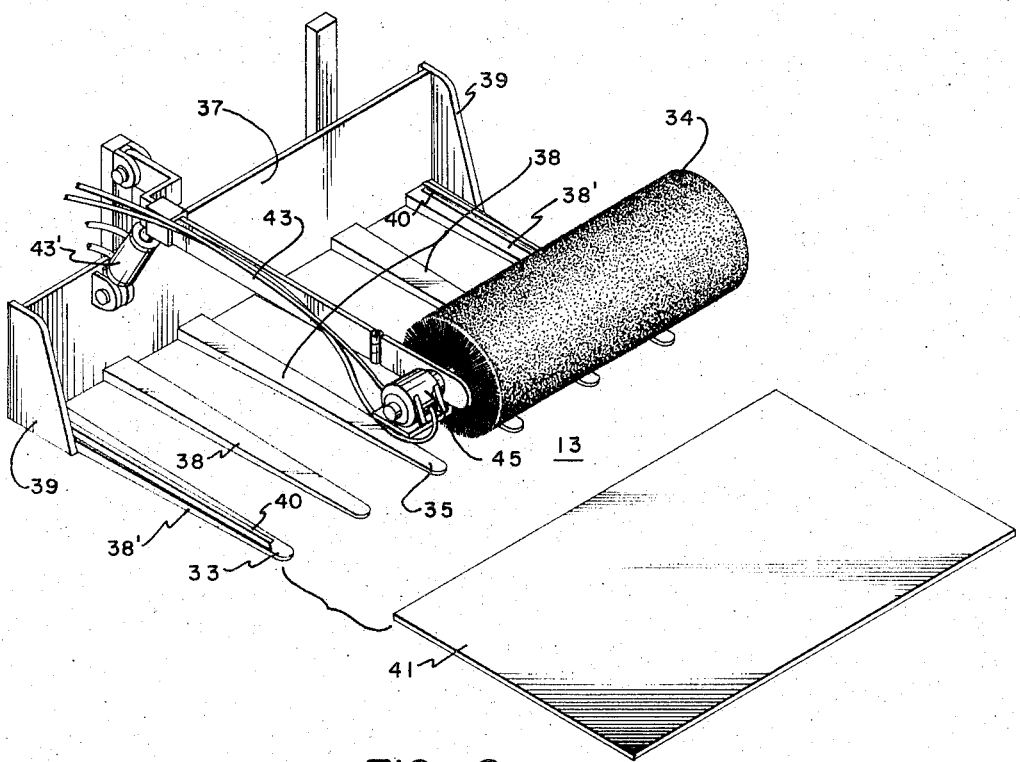
FIG. 9 is a right front perspective view of the sweeper lift subassembly of this invention.

The root cutter 12 is mounted at the rearwardmost terminal end of the chassis 11, and comprises a cutter blade 15, a multiplicity of cutting bits 16 and cutter carrying arms 17. Referring to the FIGS. 4, 7 and 8, the cutter blade 15 is an upstandingly disposed circular plate mounted at its center to the driven shaft 18 of a right-angled differential gear box 19. The gear box 19 is operable to receive torque from the power take-off (not shown) typically provided at the rearward terminal end of the chassis 11 by means of a shaft 20. As shown in the FIG. 4, the gear box 19 may include a pair of bevel gears 21 and 22 mounted on the shafts 18 and 20 respectively. Cutting bits 16 are fastened radially on each side, distally from the outer circumferential edge of the blade 15. It has been found to advantage to mount the bits 16 alternately at intervals on opposing sides of the blade 15.

Figure 5:
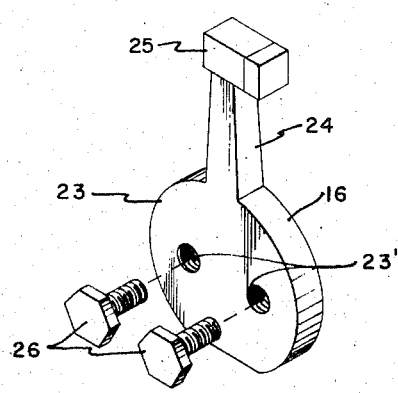
FIG. 5 is a perspective view of a typical left sided root cutting bit with respect to the blade including a pair of fastening bolts exploded away for illustrative purposes.
Figure 6:
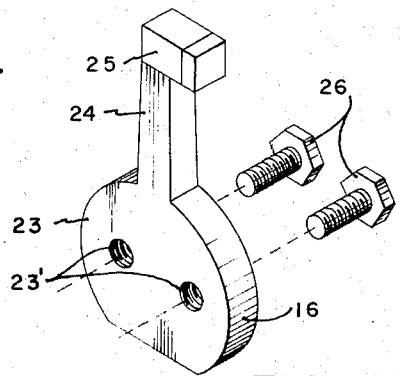
FIG. 6 is a perspective view of a typical right sided cutting bit including a pair of fastening bolts exploded away for illustrative purposes.

Referring now to the FIGS. 5 and 6, typical bits 16 comprise a body 23, a neck portion 24, and a head portion 25. The body 23 is intended to provide a suitable mounting surface through which fasteners, such as bolts 26, may be engaged through holes 23' into the blade 15. The body 23 is operable to transmit and distribute forces applied to the bit 16 into the blade 15. The neck portion 24 is intended to position the head 25 a predetermined distance from the circumferential edge of the blade 15. To accomplish this object the neck portion 24 may be a shaft-like member disposed radially from the body 23. The head portion 25 is disposed from the outermost terminal end of the neck portion 24, and projects in the direction of rotation of the blade 25. It has been found to advantage to fabricate the head portion 25 of a hard steel to prolong the cutting life of the disk 26. The head portion 25 is disposed off-center to the neck portion 24 on the respective right and left bits 16 in a manner typical of most heavy tree cutters.

Referring again to the FIGS. 7 and 8, the cutter carrying arms 17 are pivotally mounted to the chassis 11 by means of an upstanding post 27 mounted to the rearwardmost terminal end of the chassis 11, and a sleeve member 28 which rides slidably about the post 27 to which the arms 17 are attached. The arms 17 extend rearwardly and substantially horizontally from the sleeve member 28 to project the gear box 19 a suitable distance from the chassis 11. As shown in the FIGS. 1, 2 and 3, the root cutter 12 may be selectively raised and lowered, and articulated from side to side. As shown more clearly in the FIGS. 7 and 8, the root cutter 12 is raised and lowered on a pivot 27' by a hydraulic cylinder 29 fastened to a lower portion of the rearward terminal end of the chassis 11 and the arms 17 distally from the gear box 19. The cutter 12 is sidewardly articulated by means of a double acting cylinder 30 pivotly fastened at its outermost terminal end to the arms 17 distally from the gear box 19 and at its innermost terminal end to a point on the chassis 11 distally from the post 27. The root cutter 12 may include a saw guard 31 which covers the forward portions of the blade 15. In operation, the chassis 11 may be parked and the root cutter 12 which is carried in an upward position intransit may be lowered into the cutting zone. As set out above, the blade 15 may be articulated from side to side by means of the cylinder 30 to further position the cutter 12. The power take-off of the chassis 11 may be set in motion and the cylinder 29 may be further activated to provide downward pressure on the blade 15.

Referring again to the FIGS. 1, 2, 3 and 9, the sweeperlift assembly 13 comprises a pair of parallelly, substantially rectilinearly disposed lift arms 32, lift forks 33, and a sweeper brush 34. Lift arms 32 include a cambered main beam 32' and an upwardly directed lift arm column 32". The cambered main beam 32' is a curved member disposed with its concaved portion with respect to the ground, and being fastened at its rearwardmost terminal end to the uppermost terminal end of the upwardly directed column 32". The lowermost terminal end of the column 32" is pivotally mounted distally from the rearward terminal end of the chassis 11. Each of the arms 32 is raised by a hydraulic cylinder 35 pivotly fastened between the center portion of the lowermost side of the chassis 11 and the apex of the curved portion of the main beam 32'. Each arm may also include a hydraulic lift cylinder 36 which is mounted centrally on the uppermost terminal side of the chassis 11 and upper portions of the column 32". It is to be understood that the cylinders 35 and 36 disposed on each of the arms 32 are simultaneously selectively actuated by a common hydraulic pump and control means (not shown). The arms 32 are lowered by the mass of the arms 32 on the cylinders 35 and 36.

The lift forks 33 are mounted for vertical pivotting of the forwardmost terminal ends of the arms 32. As shown in the FIG. 9, the lift forks 33 include an upstandingly, transversely disposed wall 37 and a multiplicity of rectilinearly, substantially horizontal fork tine bars 38 disposed at intervals on the forwardmost terminal side of the lowermost terminal edge of the wall 37. The terminal ends of the wall 37 and the outer terminal edges of the outermost tine bars 38' may be reenforced by a gusset plate 39. The tine bars 38 may be tapered narrowing from their rearwardmost terminal ends to their forwardmost terminal ends. The uppermost terminal side of the outer edges of the outer tine bars 38' are provided with a C-shaped channels 40 fastened with its verticle wall disposed outwardly with respect to the center of the lift forks 33. The lift forks 33 include a detachable panel 41 which is slidably engagable with the channels 40. As shown in the FIGS. 1, 2 and 3, hydraulic cylinders 42 are provided between the outward portions of the arms 32 and the uppermost terminal edge of the wall 37 to change the angle of deflection of the lift forks 33.

The sweeper brush 34 is mounted on a rectilinearly disposed arm 43 which is mounted distally from one of the terminal ends of the wall 37. The arm 43 is vertically pivotally mounted to the wall 37, and is provided with a hydraulic cylinder 43' fastened between the wall 37 and the arm 43 to raise and lower the brush 34. The arm 43 is operable to position the brush 34 distally forwardly of the forwardmost terminal edge of the panel 41 and the tines 38. The brush 34 is a horizontally, substantially cylindrically-shaped bristled brush formed about a shaft (not shown). The brush 34 is driven by a hydraulic motor 45 fastened on the forwardmost terminal end of the arm 43 and connected to the brush shaft. It is to be understood that while a hydraulic motor 45 is described, other drive means such as mechanical drive trains may be used satisfactorily.

Figure 10:
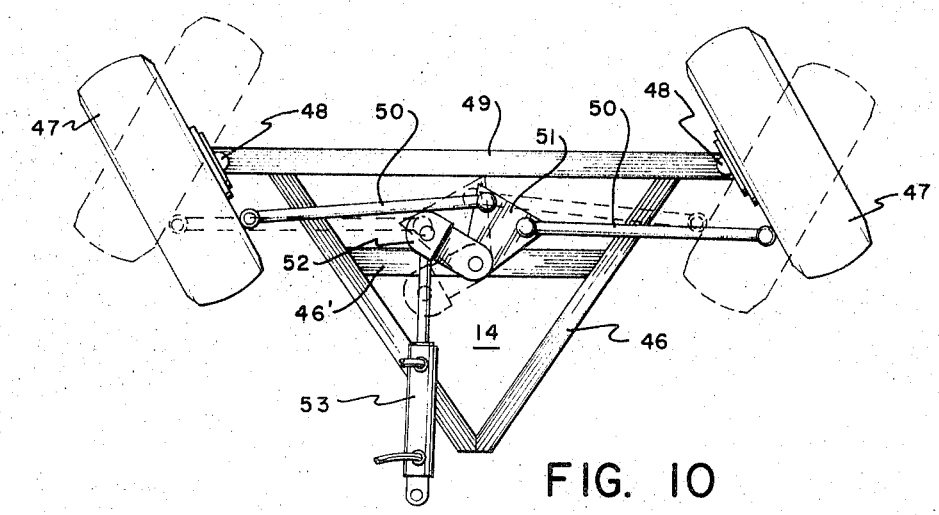
FIG. 10 is a top plan view of the steering assembly of this invention showing the assembly in several positions.
Figure 11:
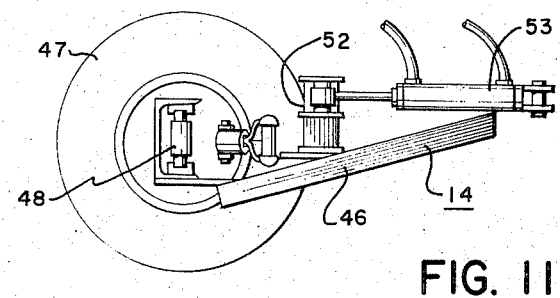
FIG. 11 is a side elevation view of a typical wheel mount of the steering assembly of this invention.

Referring now to the FIGS. 10 and 11, it has been found that the nature of loads developed against the chassis 11 are such that conventional steering assemblies are inoperable to control the vehicle 10. The steering assembly 14 employs the A-frame 46 of the typical tractor chassis 11, the front wheels 47 are mounted on commonly-known wheel swivel joints 48 at the terminal ends of the transversely disposed axel bar 49. Each of the wheels 47 is pivotally connected to the terminal ends of push rods 50. The push rods 50 are pivotally connected to a triangular plate 51 having one of its base legs disposed generally parallelly to the axle bar 49. The triangular plate 51 is pivotally mounted to the center of the uppermost edge of the cross member 46' of the A-frame 46. A push arm 52 is pivotally fastened perpendicularly to the altitude of the transversely disposed cross member 46' to the triangular plate 51. The push rods 50 and the triangular plate 51 and the push arm 52 are actuated by a double acting cylinder 53 fastened between the chassis 11 and the push arm 52 at the end opposite the triangle 51. In operation, the cylinder may be activated to push the push arm 52 in one direction, and the cylinder 53 may be activated to withdraw its piston rod to hold the push arm 52 in the opposite direction of rotation to selectively turn the wheels 47 as shown in the solid and broken lines in the FIG. 10.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A root cutter to be carried on a stump clearing vehicle, comprising:
   an upstandingly disposed circular blade mounted at its center to and driven by a gear box;
   a multiplicity of cutting bits fastened radially on each side of and projecting from the outer circumferential edge of said blade;
   cutter carrying arms fastened at one of their terminal ends to said gear box and at their ends opposite pivotally to said vehicle chassis, said carrying arms being pivotally mounted to articulate vertically and sidewardly and having hydraulic cylinders fastened between said vehicle chassis and said carrying arms to accomplish said articulation;
   means for providing mechanical power to said gear box to rotate said blade; and
   a sweeper lift assembly including a pair of lift arms pivotally fastened at each of the terminal sides of and distally from the rearwardmost terminal end of said vehicle chassis, said lift arms having means for selectively lifting said arms, and lift forks including an upstanding, transversely disposed wall fastened to the forwardmost terminal ends of said lift arms and a plurality of rectilinearly horizontally parallel tine bars fastened to said upstanding wall and a detachable panel slidably engageable with said lift arms.

2. The apparatus of claim 1 wherein said sweeper lift assembly includes a sweeper brush including a suitably rotably driven cylindrical brush fastened on a pivotally, rectilinearly disposed arm fastened to said upstanding wall and an hydraulic cylinder fastened between said lift forks and said brush arm to selectively raise and lower said brush with respect to said lift forks.

* * * * *